US012155328B2

(12) United States Patent
Chen et al.

(10) Patent No.: US 12,155,328 B2
(45) Date of Patent: Nov. 26, 2024

(54) MULTI-AXIS SERVO CONTROL SYSTEM

(71) Applicant: DELTA ELECTRONICS, INC., Taoyuan (TW)

(72) Inventors: Chien-Da Chen, Taoyuan (TW); I-Hsuan Tsai, Taoyuan (TW); Chia-Hua Lee, Taoyuan (TW); Ching-Wei Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 179 days.

(21) Appl. No.: 17/700,450

(22) Filed: Mar. 21, 2022

(65) Prior Publication Data

US 2023/0131842 A1    Apr. 27, 2023

(30) Foreign Application Priority Data

Oct. 22, 2021    (CN) .......................... 202111231505.5

(51) Int. Cl.
*H02P 25/14*    (2006.01)
*G06F 13/42*    (2006.01)
*H02P 25/064*    (2016.01)

(52) U.S. Cl.
CPC ........ *H02P 25/145* (2013.01); *G06F 13/4282* (2013.01); *H02P 25/064* (2016.02)

(58) Field of Classification Search
CPC ...... H02P 25/145; H02P 25/064; H02P 8/005; H02P 25/06; G06F 13/4282; G05B 2219/34027; G05B 2219/39236
USPC .................. 318/560, 625, 486, 246
See application file for complete search history.

(56) References Cited

U.S. PATENT DOCUMENTS

| 5,619,111 A | 4/1997 | Katagiri et al. |
| 2019/0260314 A1 | 8/2019 | Mishima et al. |
| 2021/0157320 A1* | 5/2021 | Miura ...................... B25J 9/161 |

(Continued)

FOREIGN PATENT DOCUMENTS

| CN | 106647573 A | 5/2017 |
| EP | 3842881 A1 | 6/2021 |
| JP | H08256500 A | 10/1996 |

(Continued)

OTHER PUBLICATIONS

Tagashira et al. (CN 105555489 A) "Power-cutting Device And A Multi-axis Manipulator Of The Multi-axis Manipulator" Date Published May 4, 2016 (Year: 2016).*

(Continued)

*Primary Examiner* — Jorge L Carrasquillo
(74) *Attorney, Agent, or Firm* — MUNCY, GEISSLER, OLDS & LOWE, P.C.

(57) ABSTRACT

A multi-axis servo control system includes a plurality of motors and a plurality of drive control apparatuses. The drive control apparatuses are connected to each other through an external field bus. Each drive control apparatus includes a control unit and a plurality of drive units. The drive units are connected to the control unit in series by a plurality of local buses to form a series-connected communication loop of sequentially transmitting data. Each drive unit controls at least one of the motors. The control unit receives multi-axis position commands through the external field bus, and the drive units correspondingly receive multi-axis commands through the local buses so as to control the motors in a decentralization manner.

11 Claims, 7 Drawing Sheets

(56) References Cited

U.S. PATENT DOCUMENTS

2021/0191369 A1* 6/2021 Matsumura ........ G05B 19/4155

FOREIGN PATENT DOCUMENTS

| TW | 201541854 A | 11/2015 |
|---|---|---|
| WO | WO2017159472 A1 | 9/2017 |

OTHER PUBLICATIONS

Zhang (CN 101692181 A) High-speed coordinating control network and node chip Date Published Apr. 7, 2010 (Year: 2010).*
Watanabe et al. (CN 1148215 A) Dispersing System And Multi-processor System Date Published Apr. 23, 1997 (Year: 1997).*
Office Action dated Aug. 15, 2023 of the corresponding Japan patent application No. 2022-018751.
European Search Report dated Sep. 12, 2022 in EP Application No. 22163267.2, 9 pages.
Office Action dated Feb. 7, 2023 of the corresponding Japan patent application No. 2022-018751.
Office Action dated Mar. 3, 2023 of the corresponding Taiwan patent application No. 110139250.

* cited by examiner

MULTI-AXIS SERVO CONTROL SYSTEM

BACKGROUND

Technical Field

The present disclosure relates to a multi-axis servo control system, and more particularly to a multi-axis servo control system with decentralized control of the position command and the current command.

Description of Related Art

The statements in this section merely provide background information related to the present disclosure and do not necessarily constitute prior art.

Figure 1:
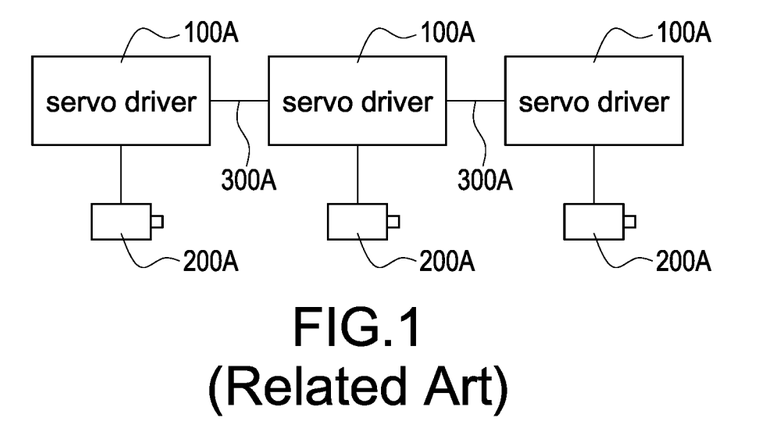
FIG. 1 is a schematic structural diagram of a first type of a multi-axis servo control system of the prior art.
Figure 2:
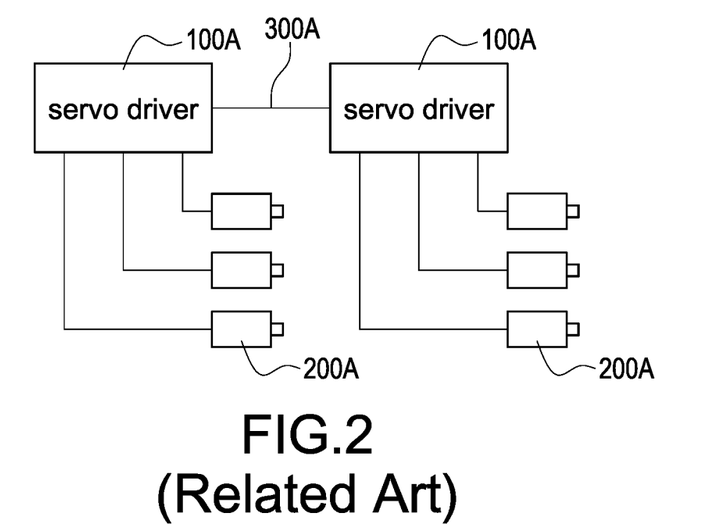
FIG. 2 is a schematic structural diagram of a second type of a multi-axis servo control system of the prior art.

Please refer to FIG. 1 and FIG. 2, which show a schematic structural diagram of a first type of a multi-axis servo control system of the prior art and a schematic structural diagram of a second type of a multi-axis servo control system of the prior art, respectively. As shown in FIG. 1, the first type adopted is that a single independent servo drive controls the rotation of a single motor, which means that one servo drive controls the rotation of one motor. For example, but not limited to one example shown in FIG. 1, three servo drivers 100A are used in cooperation with the corresponding three motors 200A. In this type of application, one servo driver 100A is connected to another servo driver 100A through a field bus 300A, and therefore each servo driver 100A can receive the control command from a host controller (or a host computer), and then control the corresponding motor 200A. In particular, the field bus 300A may be, for example, but not limited to, EtherCAT, CANOpen, PROFINET, or so on. Each servo driver 100A at least includes a controller and a power module. The controller is used to plan and control the speed of the motor, and the power module is used to provide the current output of the servo driver. However, in this type of control system, since each motor 200A is controlled by the corresponding servo driver 100A, in multi-axis applications, the synchronization is limited by the communication cycle of the field bus 300A, so that the synchronization is poor.

As shown in FIG. 2, the second type adopted is that a single independent servo drive controls the rotation of multiple motors. For example, but not limited to one example shown in FIG. 2, one servo driver 100A is used in cooperation with the corresponding three motors 200A. However, as long as the output current (power) of the servo driver 100A can drive and control the motors 200A and maintain normal operation, the servo driver 100A can control more than three motors. Similarly, one servo driver 100A is connected to another servo driver 100A through the field bus 300A, and each servo driver receives control commands from the host controller through the field bus 300A. However, due to the limitation of the output current (power), the upper limit of the number of motors 200A or the rated output of the motor 200A has been limited when the servo driver 100A is designed, and therefore its expandability and replaceability are poor.

SUMMARY

An object of the present disclosure is to provide a multi-axis servo control system to solve the problems of existing technology.

In order to achieve the above-mentioned object, the multi-axis servo control system includes a plurality of motors and a plurality of drive control apparatuses. The plurality of drive control apparatuses is connected to each other through an external field bus. Each drive control apparatus includes a control unit and a plurality of drive units. The plurality of drive units is connected to the control unit in series by a plurality of local buses to form a series-connected communication loop of sequentially transmitting data. Each drive unit controls at least one of the plurality of motors. The control unit receives multi-axis position commands through the external field bus, and the drive units correspondingly receive multi-axis commands through the local buses so as to control the plurality of motors in a decentralization manner.

In one embodiment, the local bus is a high-speed bus. The local bus starts with an output end of the control unit, connects in series to the drive units in sequence, and finally feedbacks to an input end of the control unit as the end to form the series-connected communication loop of sequentially transmitting data.

In one embodiment, each drive unit includes a processor and the control unit comprises a processor. The series-connected communication loop includes the processor of the control unit, the output end of the control unit, an input end of each drive unit, the processor of each drive unit, an output end of each drive unit, the input end of the control unit, and the processor of the control unit.

In one embodiment, the control unit includes a command processor and a command synchronizer. The command synchronizer is connected to the command processor.

In one embodiment, the control unit includes a command generator, a command processor, and a command synchronizer. The command processor is connected to the command generator. The command synchronizer is connected to the command processor.

In one embodiment, the control unit is a slave controller, and the control unit provides a slave operation mode to control the drive units in the same drive control apparatus.

In one embodiment, the control unit is a master controller, and the control unit provides a master operation mode to control the drive units in the same drive control apparatus and the control units and the drive units in other drive control apparatuses. Each drive unit includes a current loop unit. The current loop unit receives a current command and a current value and compares the current command with the current value to generate a current control signal.

In one embodiment, each drive unit further includes a command process unit and a command synchronization unit. The command process unit receives the current command and processes the current command. The command synchronization unit is connected to the command process unit, receives the processed current command, synchronizes the processed current command, and provides the synchronized current command to the current loop unit.

In one embodiment, each drive unit further includes a current process unit. The current process unit receives the sampled current value, processes the sampled current value, and provides the processed current value to the current loop unit.

In one embodiment, each drive unit further includes a feedback process unit. The feedback process unit receives a plurality of feedback commands, performs communication packet processing on the feedback commands, and provides the processed feedback commands to the output of the local bus.

Accordingly, the multi-axis servo control system provides the following features and advantages: 1. The distribution calculations realized by the processing and control of the current (torque) command by the drive unit and the processing and control of the position (speed) command by the control unit can significantly reduce the calculation amount of the control unit since the processing and control of the current (torque) command processing and control system are performed by the drive unit, so that a controller with better cost and relatively low-level function may be selected and used, and also, the expandability and replaceability of the drive control apparatus can be implemented. 2. The high-speed local bus realizes a complete communication transmission loop of series-connected feedback through the wiring of the backplane, which can avoid data distortion and attenuation. 3. By fine calculation of the control unit, the command data are finely divided into microsecond-scale or even nanosecond-scale command data, so that the drive unit can precisely (finely) control each axis motor. 4. The control unit may operate in the slave operation mode and the master operation mode so the flexibility and diversity of the control unit can be implemented.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Reference will now be made to the drawing figures to describe the present disclosure in detail. It will be understood that the drawing figures and exemplified embodiments of present disclosure are not limited to the details thereof.

Figure 3:
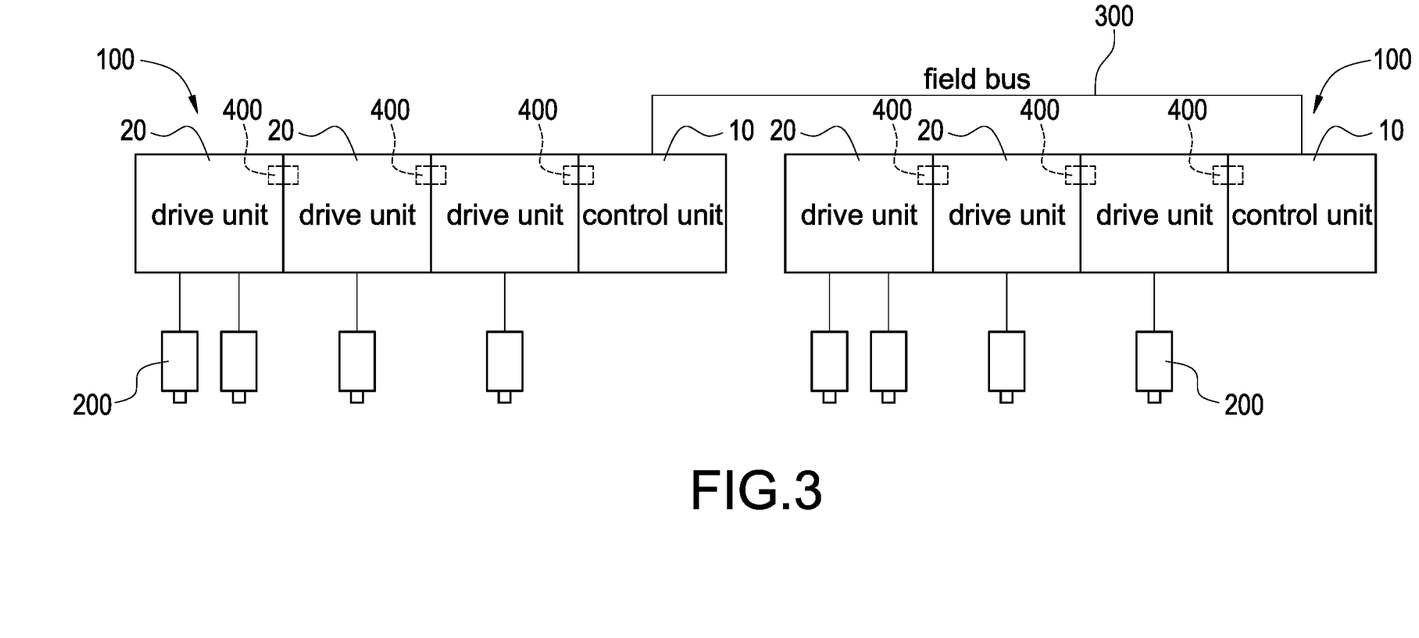
FIG. 3 is a schematic structural diagram of a multi-axis servo control system according to the present disclosure.

Please refer to FIG. 3, which shows a schematic structural diagram of a multi-axis servo control system according to the present disclosure. The multi-axis servo control system includes a plurality of motors 200 and a plurality of drive control apparatuses 100. The plurality of drive control apparatuses 100 are connected to each other through an external field bus 300. As shown in FIG. 3, two sets of drive control apparatuses 100 are taken as an example, but the present disclosure is not limited thereto. In the present disclosure, the application of the plurality of motors 200 are used, for example, but not limited to, in fields of mechanical automation operation and robotic arm operations such as conveying and handling device, pick and place device, surface mount technology (SMT), positioning device for visual inspection, spot welding and reciprocating measurement, etc.

Each drive control apparatus 100 includes a control unit 10 and a plurality of drive units 20. The plurality of drive units 20 are connected to each other and the drive unit 20 is connected to the control unit 10 through a plurality of local buses 400 to form a series-connected communication loop of sequentially transmitting data. Each drive unit 20 controls at least one of the motors 200. However, the number and form of controlling the motors 200 by each drive unit 20 are not limited to the embodiment shown in FIG. 3.

The control unit 10 receives multi-axis position commands (or multi-axis speed commands) through the external field bus 300. The drive units 20 correspondingly receive multi-axis commands through the local buses 400 to control the motors 200 in a decentralization manner. The detailed description will be made hereinafter.

As shown in FIG. 3, the present disclosure provides a multi-axis servo control system with servo drive design for multi-axis motor control to control the traditional multi-axis motors in a decentralization manner. The multi-axis servo control system includes the control unit 10, the drive unit 20 (also called servo unit or servo drive unit), the local buses 400, and the motors 200, is connected through the single external field bus 300. The characteristics of this control system structure are:

1. The high-speed local buses 400 are connected by inputs and outputs, and the detailed description will be made hereinafter.
2. The control unit 10 is responsible for the synchronous control of the position and speed of each axis motor 200 and the movement flow of each axis, and the detailed description will be made hereinafter.
3. The drive unit 20 is responsible for the current control, the current sampling, and the position feedback of the motor 200, and one drive unit 20 is used to control one or more than one motors 200. Therefore, the drive unit 20 with greater output power may be provided by replacement, and more motors 200 or motors 200 with greater rated power may be driven and controlled without affecting the operation of the whole machine, and therefore expandability and replaceability are better.
4. The control unit 10 may operate in a master operation mode or a slave operation mode to provide commands to control each axis motor 200. When the control unit 10 operates in the master operation mode (as a master), the control unit 10 actively controls other servo drivers (that is, the drive control apparatuses 100) and multiple motors 200 connected to its multiple servo drivers through the external field bus 300. When the control unit 10 operates in the slave operation mode (as a slave), the control unit 10 controls multiple motors 200 connected to its multiple servo drivers and passively receives external bus commands, and the detailed description will be made hereinafter.

Figure 4:
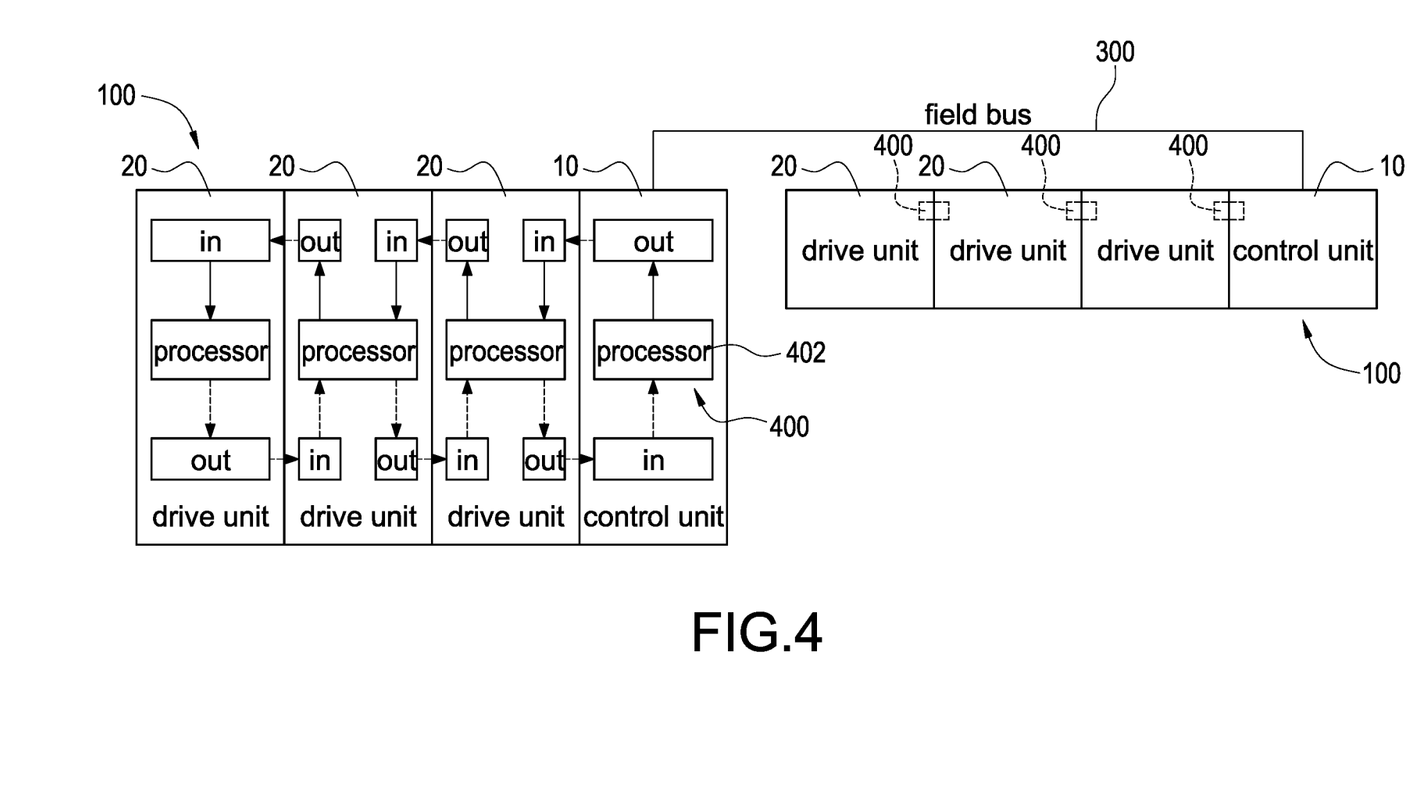
FIG. 4 is a schematic block diagram of the design of high-speed local buses according to the present disclosure.

Please refer to FIG. 4, which shows a schematic block diagram of the design of high-speed local buses according to the present disclosure. The high-speed local buses 400 are equipped with a hardware design (for example, in this embodiment, it is realized by the wiring on the backplane), and a series-connected feedback manner is used. In particular, the local buses 400 in the left drive control apparatus 100 are the expansion of the local buses 400 in the right drive control apparatus 100. Take the control unit 10 as the starting station. The data are transmitted to an input end in (or called an input module in) of the first series-connected drive unit 20. The received data are processed by a processor 402, and the processed data are transmitted to an input end in of the second series-connected drive unit 20 through an output end out (or called an output module out) of the first series-connected drive unit 20. Therefore, it is sequentially to the input end in of the last series-connected drive unit 20. Finally, the output end out of the last series-connected drive unit 20 is outputted to the other input end in of the previous drive unit 20, and then returned to the other input end in of the control unit 10 in sequence, thereby forming a complete communication transmission loop. Accordingly, the data are communicated and transmitted through the series-connected feedback method, which can avoid the distortion and attenuation of the data.

Figure 5:
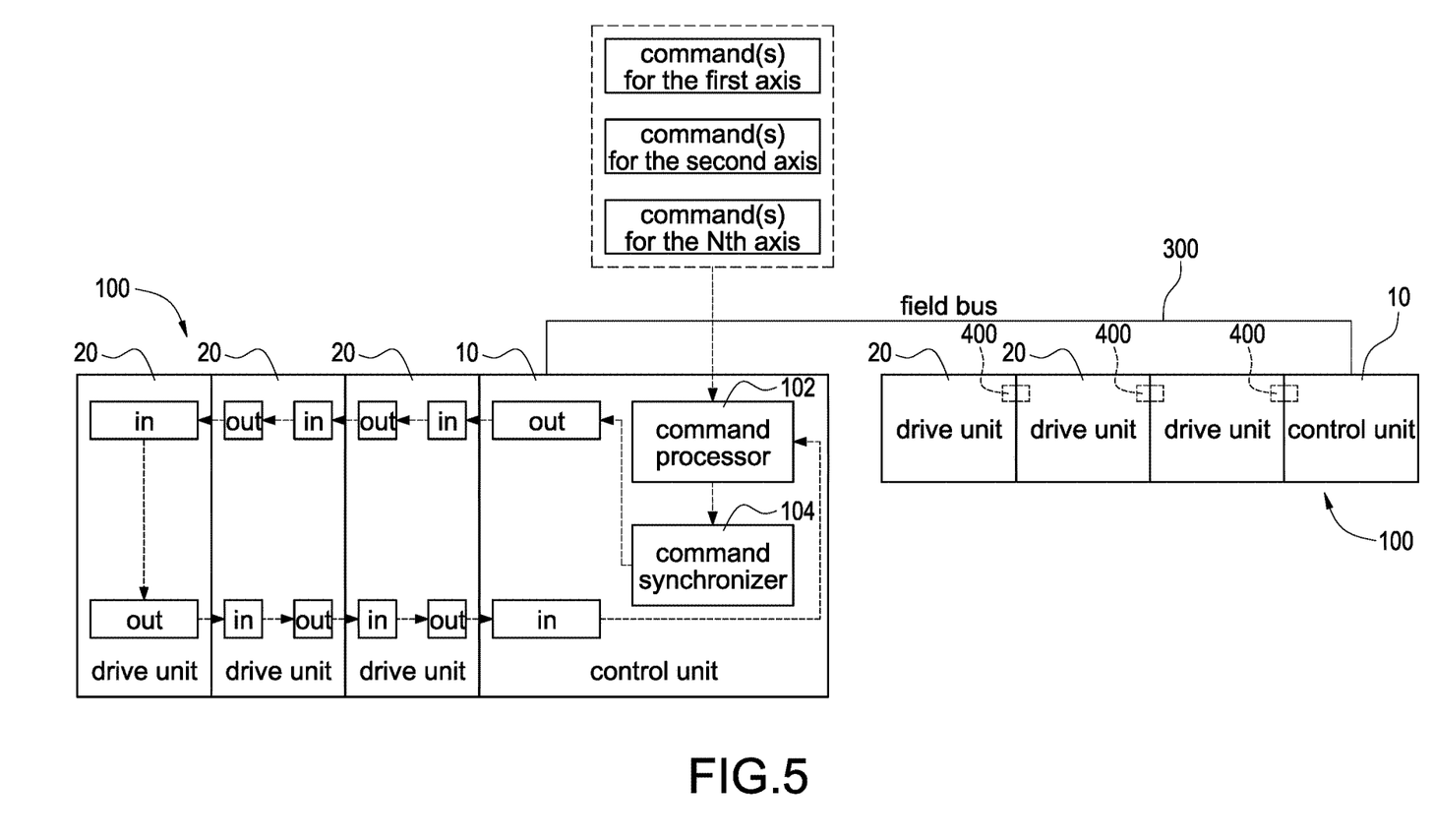
FIG. 5 is a schematic block diagram of the control design of a control unit according to the present disclosure.

Please refer to FIG. 5, which shows a schematic block diagram of the control design of a control unit according to the present disclosure. The control unit 10 receives multi-axis command data (including a command of controlling the first axis, a command of controlling the second axis, and so forth, and a command of controlling the Nth axis) transmitted from the external field bus 300. In particular, the multi-axis command data are provided by a host controller, and the command data including position, speed, torque, and so on. In one embodiment, the control unit 10 includes a command processor 102 and a command synchronizer 104. After the control unit 10 receives the multi-axis command data, the multi-axis command data are processed by the command processor 102, including command smoothing processing, command interpolation processing, and so on. Afterward, the processed multi-axis command data are synchronized by the command synchronizer 104, and the synchronized multi-axis command data are transmitted to the first drive unit 20 through the high-speed local buses 400. Also, the command data of each drive unit 20 is transmitted sequentially through the local buses 400, and the command data are finally transmitted back to the control unit 10. Afterward, the control unit 10 processes the status information of each axis, and returns the processed status information to the field bus 300. In other words, the time schedule controlled by each axis motor 200 is executed by the control unit 10. Therefore, the multi-axis command data provided from the host controller are finely calculated/processed by the command processor 102 and the command synchronizer 104, so that the second-scale or millisecond-scale command data are finely divided into microsecond-scale or even nanosecond-scale command data. The microsecond-scale or even nanosecond-scale command data are provided to the drive unit 20 of each axis motor 200, so that the drive unit 20 can precisely (finely) control each axis motor 200. In one embodiment, the control unit 10 only needs to be responsible for processing command data, and each corresponding drive unit 20 is responsible for the current control of each axis motor 200, achieving the effect of computing distribution.

In particular, the control unit 10 has capability of position command control and current command control, wherein the position command corresponds to a speed command, and the current command corresponds to a torque command. In the existing traditional control mechanism, the position (speed) command control and the current (torque) command control are usually processed by the same processor or controller. However, in the present disclosure, the processing and control of the current (torque) command are performed by the drive unit 20, and the processing and control of the position (speed) command is performed by the control unit 10. In other words, due to the advantage of modularity of the present disclosure, the current (torque) command and the position (speed) command can be performed by different processors or controllers (i.e., the drive unit 20 and the control unit 10). Accordingly, the calculation amount of the control unit 10 can be significantly reduced since the processing and control of the current (torque) command processing and control system are performed by the drive unit 20, so that a controller with better cost and relatively low-level function may be selected and used. Also, the expandability and replaceability of the drive control apparatus 100 can be implemented.

Figure 6:
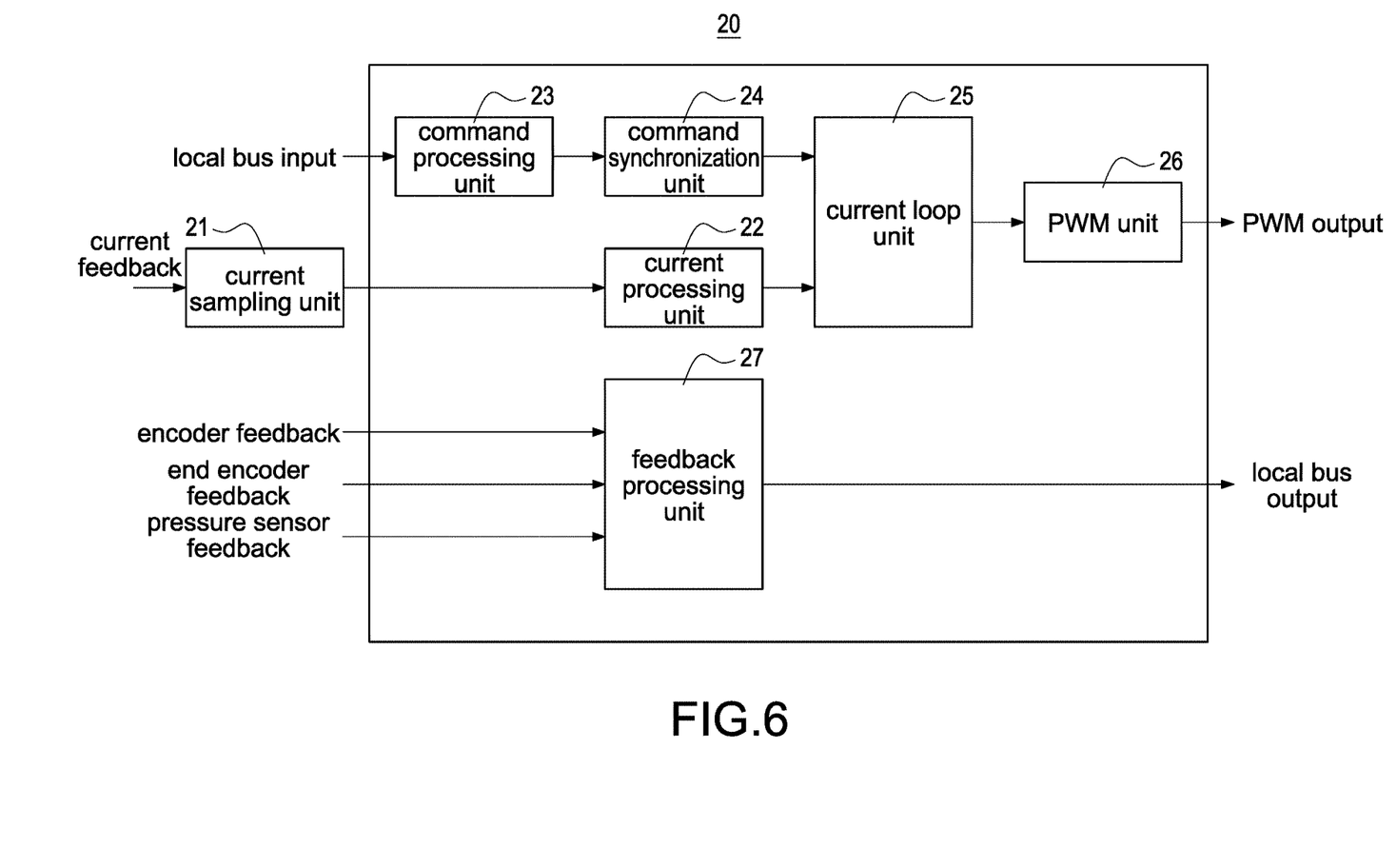
FIG. 6 is a schematic block diagram of the control design of drive units according to the present disclosure.

Please refer to FIG. 6, which shows a schematic block diagram of the control design of drive units according to the present disclosure. In one embodiment, the drive unit 20 can complete the current loop control by a control chip. The drive unit 20 includes a current sampling unit 21, a current processing unit 22, a command processing unit 23, a command synchronization unit 24, a current loop unit 25, a pulse width modulation (PWM) signal unit 26, and a feedback processing unit 27. The current sampling unit 21 receives a current feedback signal and samples the current feedback signal. For example, the current sampling unit 21 samples the current feedback signal by using a Delta-Sigma ($\Delta$-$\Sigma$) modulation manner. The current processing unit 22 receives the sampled current feedback signal to process the sampled current feedback signal. The command processing unit 23 receives command data provided from the local buses 400 to provide local high-speed command data processing. The command synchronization unit 24 is a command synchronization timing mechanism, and is used to synchronize command data. The current loop unit 25 receives the synchronization command data provided by the command synchronization unit 24 and the feedback current information provided by the current processing unit 22 to perform current loop control. The PWM unit 26 generates a PWM signal to control the actual current of the motor 200 according to the current loop control of the current loop unit 25. The feedback processing unit 27 is used to receive the encoder feedback, end optical ruler feedback, and force sensor feedback for performing communication packet processing of the encoder.

Specifically, the drive unit 20 receives command data provided from the control unit 10 and performs position control loop, speed control loop, and encoder position processing of the motor 200. In particular, the command data include, but not limited to, current command, electrical angle, speed, and communication delay compensation, etc., for the transmission and reception of the error detection and correction mechanism.

Since the drive unit 20 will transmit the current command, electrical angle, and communication delay compensation to the drive unit 20 of other axes during the interruption period, the synchronization unit 24 is needed to perform the time synchronization mechanism for the drive units 20 of each axis so as to ensure that the encoder sampling, current feedback sampling, and PWM effective time are synchronized between multiple axes.

With the current feedback sampling, the feedback data is decoded by the current processing unit 22, processed with a self-designed synchronization filter (Sync Filter) structure, and the current feedback information is transmitted back to the current loop for control. In particular, the current sampling methods include but are not limited to Delta-Sigma ($\Delta$-$\Sigma$), ADC, etc.

The current loop control of the current loop unit 25 includes PI (differential-integral) control, d-q axis (direct-angle axis) current conversion, SVPWM control, voltage decoupling, and dead time compensation. The current loop control of the current loop unit 25 realizes the six-bridge control of the IGBT through the comparison value calculated by the SVPWM control and the PWM unit 26.

The feedback processing unit 27 receives an encoder feedback signal, an end encoder signals, and a pressure sensor signal. These communication formats of all signals include ECC (error correcting code) functions. After the feedback processing unit 27 completes the communication packet, the feedback processing unit 27 transmits the data back to the control unit 10 through the local buses 400, and then performs a full closed-loop control of position and torque.

In the present disclosure, the control unit 10 may operate in a slave operation mode and a master operation mode. Please refer to FIG. 7, which shows a schematic block diagram of the control unit as a slave according to the present disclosure. When the control unit 10 operates in the slave operation mode, i.e., the control unit 10 plays the role of a slave, the multi-axis command data are provided by a host controller, a programmable logic controller (PLC), or a motion controller. Therefore, the drive units 20 receive the plurality of multi-axis command data to drive and control each axis motor 200. In the slave operation mode, the control unit 10 passively receives the multi-axis command data provided by the host controller, and the multi-axis command data are finely calculated by the command processor 102 and the command synchronizer 104, so that the drive unit 20 can precisely (finely) control each axis motor 200.

Figure 7:
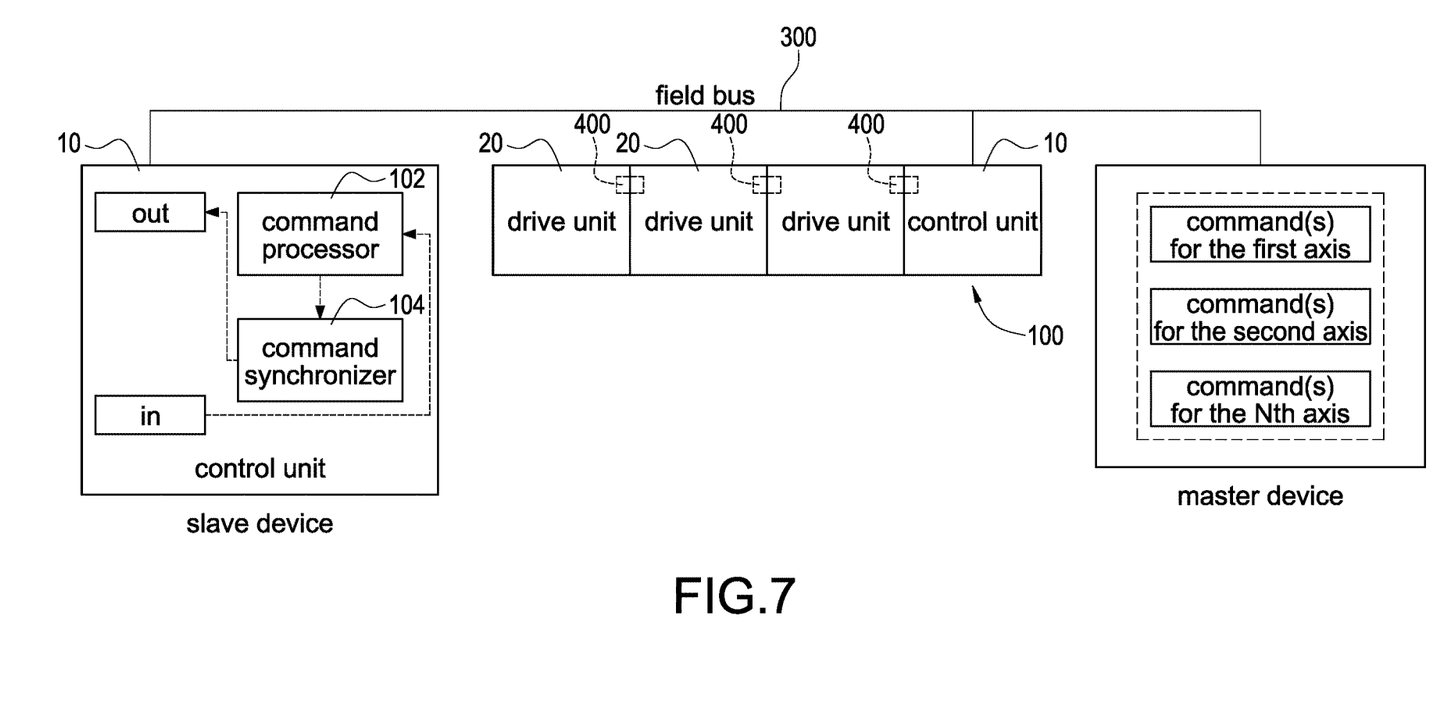
FIG. 7 is a schematic block diagram of the control unit as a slave according to the present disclosure.

The master device (may be a third-party host controller) is shown on the right of FIG. 7. The third-party host controller (the master device) plans the commands of each axis and transmits them (the commands of each axis) to each slave device through the field bus 300. The related slave information will also be transmitted back to the third-party host controller through the field bus 300. For the slave device, each slave device provides the multi-axis command data to the third-party slave device, so that the third-party slave device can control each axis motor 200 in the slave device separately.

Figure 8:
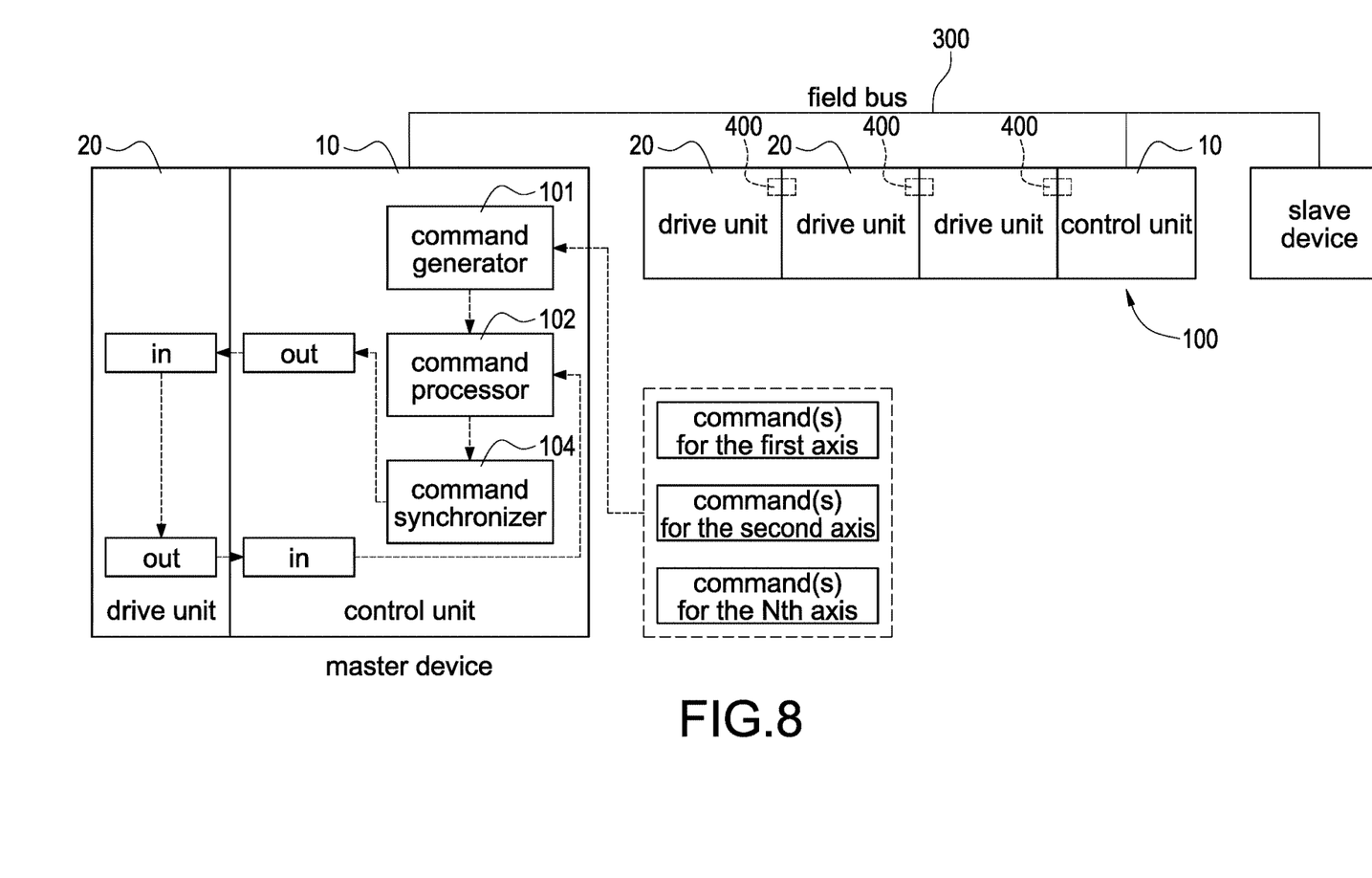
FIG. 8 is a schematic block diagram of the control unit as a master according to the present disclosure.

Please refer to FIG. 8, which shows a schematic block diagram of the control unit as a master according to the present disclosure. In the master operation mode, the control unit 10 has the function of a master controller, that is, in addition to controlling the local drive unit 20, the control unit 10 also generates command information (data) through the command generator 101 and transmits the command information (data) to other slave devices through the field bus 300, and then controls other slave devices. In other words, when the control unit 10 itself can act as a master controller, a third-party host controller is not required, and therefore the planning, interpolation, and synchronization of the command data of each axis can be completed in the control unit 10. In one embodiment, by program programming, external axis control or internal axis control can be provided for the user, and the programmed program can be downloaded to the control unit 10. Therefore, the control unit 10 operating in the master operation mode controls the motor 200 of the external axis and/or the internal axis according to the programmed program.

In summary, the present disclosure has the following features and advantages:
1. The distribution calculations realized by the processing and control of the current (torque) command by the drive unit 20 and the processing and control of the position (speed) command by the control unit 10 can not only significantly reduce the calculation amount of the control unit 10 since the processing and control of the current (torque) command processing and control system are performed by the drive unit 20, so that a controller with better cost and relatively low-level function may be selected and used, and also, the expandability and replaceability of the drive control apparatus 100 can be implemented.
2. The high-speed local bus realizes a complete communication transmission loop of series-connected feedback through the wiring of the backplane, which can avoid data distortion and attenuation.
3. By fine calculation of the control unit 10, the command data are finely divided into microsecond-scale or even nanosecond-scale command data, so that the drive unit 20 can precisely (finely) control each axis motor 200.
4. The control unit 10 may operate in the slave operation mode and the master operation mode so the flexibility and diversity of the control unit 10 can be implemented.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:
1. A multi-axis servo control system comprising:
a plurality of motors, and
a plurality of drive control apparatuses connected to each other through an external field bus, with each drive control apparatus comprising:
a control unit, and
a plurality of drive units connected to the control unit in series, wherein the control unit is connected in series to a first drive unit of the plurality of drive units through a first local bus of a plurality of local buses, and other drive units are connected in series through other local buses other than the first local bus to form a series-connected communication loop of sequentially transmitting data; each drive unit configured to control at least one of the plurality of motors,
wherein the control units are connected to each other through the external field bus, and configured to directly receive multi-axis position commands through the external field bus, and
wherein each control unit is configured to provide the multi-axis position commands to the drive units in the drive control apparatus same as the control unit or to the drive units in the drive control apparatus different from the control unit, and therefore the drive units are configured to correspondingly receive multi-axis commands through the local buses so as to control the plurality of motors in a decentralization manner.
2. The multi-axis servo control system as claimed in claim 1, wherein the local bus is a high-speed bus,
wherein the local bus starts with an output end of the control unit, connects in series to the drive units in sequence, and finally feedbacks to an input end of the control unit as the end to form the series-connected communication loop of sequentially transmitting data.
3. The multi-axis servo control system as claimed in claim 2, wherein each drive unit comprises a processor and the control unit comprises a processor, the series-connected communication loop comprises the processor of the control unit, the output end of the control unit, an input end of each drive unit, the processor of each drive unit, an output end of each drive unit, the input end of the control unit, and the processor of the control unit.

4. The multi-axis servo control system as claimed in claim 1, wherein the control unit comprises:
   a command processor, and
   a command synchronizer connected to the command processor.

5. The multi-axis servo control system as claimed in claim 1, wherein the control unit comprises:
   a command generator,
   a command processor connected to the command generator, and
   a command synchronizer connected to the command processor.

6. The multi-axis servo control system as claimed in claim 1, wherein the control unit is a slave controller, and the control unit is configured to provide a slave operation mode to control the drive units in the same drive control apparatus.

7. The multi-axis servo control system as claimed in claim 1, wherein the control unit is a master controller, and the control unit is configured to provide a master operation mode to control the drive units in the same drive control apparatus, and control the control units and the drive units in other drive control apparatuses.

8. The multi-axis servo control system as claimed in claim 1, wherein each drive unit comprises:
   a current loop unit configured to receive a current command and a current value, and compare the current command with the current value to generate a current control signal.

9. The multi-axis servo control system as claimed in claim 8, wherein each drive unit further comprises:
   a command process unit configured to receive the current command, and process the current command, and
   a command synchronization unit connected to the command process unit, configured to receive the processed current command, synchronize the processed current command, and provide the synchronized current command to the current loop unit.

10. The multi-axis servo control system as claimed in claim 8, wherein each drive unit further comprises:
    a current process unit configured to receive the sampled current value, process the sampled current value, and provide the processed current value to the current loop unit.

11. The multi-axis servo control system as claimed in claim 8, wherein each drive unit further comprises:
    a feedback process unit configured to receive a plurality of feedback commands, perform communication packet processing on the feedback commands, and provide the processed feedback commands to an output of the local bus.

\* \* \* \* \*